US008199662B2

United States Patent
Huang et al.

(10) Patent No.: US 8,199,662 B2
(45) Date of Patent: Jun. 12, 2012

(54) METHOD FOR CAPACITY EVALUATION IN OFDM NETWORKS

(75) Inventors: Xuemin Huang, München (DE); Kurt Majewski, München (DE); Ulrich Türke, Berlin (DE)

(73) Assignee: Nokia Siemens Networks Oy, Espoo (FI)

( * ) Notice: Subject to any disclaimer, the term of this patent is extended or adjusted under 35 U.S.C. 154(b) by 1051 days.

(21) Appl. No.: 12/153,441

(22) Filed: May 19, 2008

(65) Prior Publication Data

US 2009/0010176 A1     Jan. 8, 2009

(30) Foreign Application Priority Data

May 18, 2007 (EP) .................................... 07009979

(51) Int. Cl.
*H04J 11/00* (2006.01)
*H04B 15/00* (2006.01)
(52) U.S. Cl. .................... 370/252; 370/203; 455/63.1
(58) Field of Classification Search .................. 370/203, 370/208, 225, 242, 252, 315, 328, 329, 342, 370/344; 455/349, 410, 413, 414.1, 422.1, 455/435, 435.1
See application file for complete search history.

(56) References Cited

U.S. PATENT DOCUMENTS

| | | | | |
|---|---|---|---|---|
| 6,175,550 | B1 * | 1/2001 | van Nee | 370/206 |
| 6,351,499 | B1 * | 2/2002 | Paulraj et al. | 375/267 |
| 2003/0095506 | A1 * | 5/2003 | Jalali et al. | 370/252 |

OTHER PUBLICATIONS

Zhiyong Chen, Novel Power Loaing Algorithm for Downlink Multiple Streams MIMO system, 2008, IEEE, pp. 1-4.*
Zhu Han, Power Minimization Under Throughput Management Over Wireless Networks With Antenna Diversity, 2004, IEEE, pp. 2170-2181.*
Che-Sheng, Comparative Downlink Shared Channel Performance Evaluation of WCDMA, 2008, IEEE, pp. 1165-1170.*
Zhu Han, Power Maximization Under Throughput Management Over Wireless Networks With Antenna Diversity, IEEE, 2004.*
Che-Sheng Chiu, Comparative Downlink Shared Channel Performance Evaluation of WCDMA, IEEE, 2004.*
Chiu et al "Comparative Downlink Shared Channel Performance Evaluation of WCDMA Release 99 and HADPA", Mar. 2004, pp. 1165-1170.

* cited by examiner

*Primary Examiner* — Chi Pham
*Assistant Examiner* — Prince A Mensah
(74) *Attorney, Agent, or Firm* — Staas & Halsey LLP

(57) ABSTRACT

A fast and simple method evaluates the capacity of OFDM-based radio networks using adaptive modulation and coding. From a mapping of SINR values to achievable data throughput, constant coefficients defining a linear function for the required channel activity of a single user are determined. Subsequently, linear equations for total uplink and downlink channel activity are obtained which allow fast numerical solutions.

22 Claims, 3 Drawing Sheets

| AMC modulation/coding scheme | Net Throughput [Mbps] | SINR [dB] |
|---|---|---|
| QPSK 1/2 | 6.34 | 2.9 |
| QPSK 3/4 | 9.5 | 6.3 |
| 16QAM 1/2 | 12.67 | 8.7 |
| 16QAM 3/4 | 19.01 | 12.7 |
| 64QAM 2/3 | 25.34 | 16.9 |
| 64QAM 3/4 | 28.51 | 18 |
| 64QAM 5/6 | 31.68 | 19.9 |

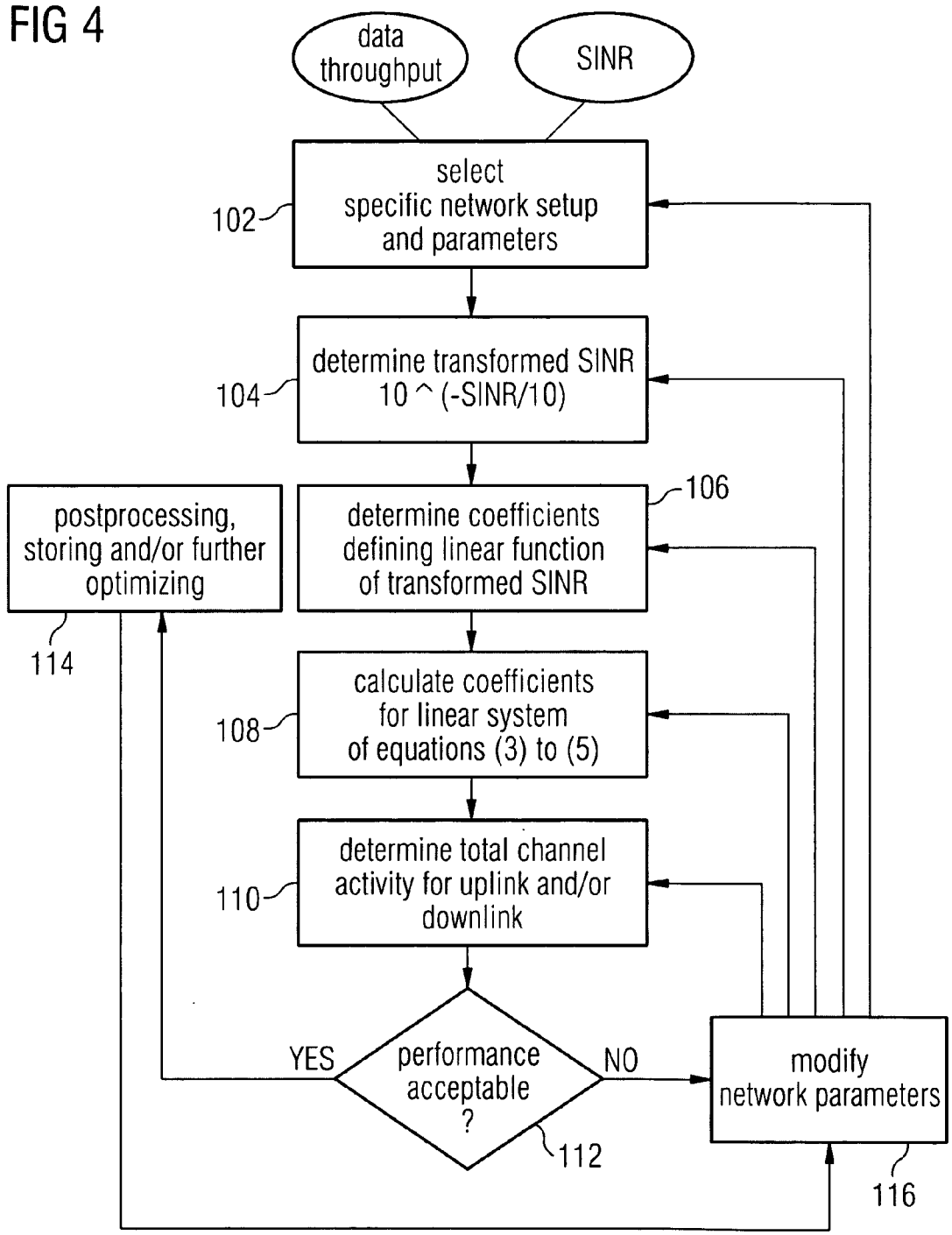

METHOD FOR CAPACITY EVALUATION IN OFDM NETWORKS

CROSS REFERENCE TO RELATED APPLICATIONS

This application is based on and hereby claims priority to European Application No. EP07009979 filed on May 18, 2007, the contents of which are hereby incorporated by reference.

BACKGROUND OF THE INVENTION

The present invention is generally related to data communication, and in particular to the evaluation of capacity for radio networks based on orthogonal frequency division multiplexing (OFDM) with adaptive modulation and coding (AMC).

In order to evaluate existing networks or to plan network structures for a radio communication network, it is necessary to determine the capacity and coverage of a network or part of the network and the expected load occurring for the network. Such an evaluation may be desired for setting antenna parameters, for modifying and adapting elements of a network and/or for constructing a new radio network. The capacity describes the potential throughput of data in the communication network, and with this the number of users which may be served by the network. Usually, a radio communication network will comprise several base stations or antenna sites, each covering a certain area. Users of the radio network located in these coverage areas will be connected to the network through at least one of the serving antennas of that area. Therefore, the site locations and parameters/settings of antennas have a large effect on the capacity and general efficiency of a network. In order to optimize such parameters of a network, various issues such as the number of users and their location, kind of services offered and requested by users, interference and noise between all elements of the network and several more have to be taken into account.

For data transmission, signals on a radio connection are modulated onto a carrier signal. This may be done by changing the phase, frequency, and/or amplitude of a carrier. Examples for digital modulation techniques are phase shift keying (PSK), frequency shift keying (FSK), or amplitude shift keying (ASK). In phase shift keying, the signal to be transmitted is modulated by changing the phase of a reference signal. Each one of a finite number of defined phases corresponds to a unique bit pattern, forming a symbol, which allows transmitting a digital signal of bits. A demodulator at the receiving end will then be able to extract the original signal from the detected phase or phase change. While any number of phases may be used for phase modulation, binary phase shift keying employing two phases and quadrature phase shift keying employing four phases are common examples. In a similar way, data is transmitted using frequency shift keying by changing the output frequency of the carrier signal, e.g. between two (binary FSK) or more discrete frequencies. Amplitude shift keying leaves frequency and phase of the carrier constant while changing the amplitude in order to transmit a signal, for example using two levels of amplitude representing a binary zero and one. More complicated modulation schemes are also known, such as quadrature amplitude modulation (QAM), where two out-of-phase carrier waves are amplitude-modulated. The term "quadrature" describes the 90 degree-phase shift between those carriers. Further techniques and combinations are conceivable. Furthermore, coding is used for adapting a signal to be transmitted. This may include improving transmission quality and fidelity, modifying the signal spectrum, increasing the information content, providing error detection and/or correction, and providing data security. A large number of coding schemes is known and readily used in the art, such as forward error correction.

Each modulation and coding scheme has its own strengths such as achievable bandwidth, and proneness to errors and interference may also vary with the selected scheme. The modulation and coding scheme used in a radio communication network thus has substantial influence on the achievable transmission rate. This fact is used in adaptive modulation and coding (AMC), also referred to as link adaptation. With AMC, the currently achieved signal quality and current channel conditions are used for determining the subsequently deployed modulation and coding scheme for transmitting data on a communication link. This may e.g. be achieved by feedback to the transmitter regarding the transmitted signal quality, or by assuming that the received signal quality is approximately that of the transmitted signal. While some coding schemes may support higher transmission rates or data throughput, others may e.g. be more robust and less sensitive to noise and errors at the expense of a lower bit rate. Schemes may be selected such that the signal-to-interference-and-noise ratio SINR and thus signal quality of the radio connection is optimized at any time. When the SINR falls below a predefined threshold value, the modulation scheme may be changed in order to achieve a better SINR. Further parameters of the connection link or the protocol used may be adapted along with the modulation and coding.

Another modulation scheme for data transmission, which may be applied in but is not limited to radio communication networks, is Orthogonal Frequency Division Multiplex (OFDM). OFDM is a modulation scheme based on multiple orthogonal sub-carriers. Each of the sub-carriers is modulated with a common modulation scheme such as those described above, e.g. QAM or PSK, at a low symbol rate. The orthogonality of the sub-carriers prevents cross-talk although the narrow frequency bands of the sub-carriers may be arranged very close together. The concept of OFDM may also be used for an access scheme, OFDMA (orthogonal frequency division multiple access). This basically means that different OFDM sub-carriers are assigned to different users. However, OFDM may also be combined with other access schemes such as time division (TDMA), frequency division (FDMA) or code division (CDMA) multiple access.

Example networks using OFDM/OFDMA are e.g. WiMAX (Worldwide Interoperability for Microwave Access), intended to provide wireless data transmission over long distances, or Flash-OFDM (Fast Low-latency Access with Seamless Handoff-OFDM) as a packet based mobile network. Both concepts and corresponding standards such as IEEE 802.16 for WiMAX are well known in the art, just as further networks applying OFDM, and will not be discussed in detail.

AMC as described above may be advantageously applied to OFDM systems, such that each of the orthogonal sub-carriers is subject to adaptive modulation and coding. This will further increase stability of the connection. Of course, AMC may alternatively also be applied across all or some sub-carriers simultaneously.

In a OFDM-based network, the number of users which may be served by one antenna will depend strongly on the interference caused by neighbouring antennas. When interference is high, the achievable signal-to-noise-ratio will be lowered, and thus a modulation scheme with less throughput but higher noise stability may be selected by the AMC. In turn, this interference from other antennas in the network is dependent on the location, settings, and load of these further antennas. The load of one of these antennas is again dependent on the number of users served by this antenna and the interference from all other antennas. As a result, transmission and user capacities of a single antenna cannot be considered separately, but has to factor in all antennas and users by coupled equations. Since the number of users and thus of user positions is in general substantially higher than the number of potential antenna positions, the presence of user positions within the relevant equations complicates the solution of such a system of coupled equations. As an example, 100 to 10000 antenna positions may have to be taken into account, but also up to 10 million user positions. This leads to tedious numerical calculations for evaluating a communication network.

In UMTS (Universal Mobile Telecommunications System) radio networks, the basic situation is similar. However, it is known that the adaptive power control used in UMTS networks may be linearized for purposes of such calculations. Together with averaging effects it is thus possible and common in the art to eliminate user positions from the coupled system of equations, which simplifies the remaining equations considerably. Only about 100 to 10000 equations usually remain, which can easily be solved by iterative numeric processes, thus allowing a simple and fast evaluation of UMTS network capacity.

The approach used for UMTS systems can not be transferred to OFDM based networks, as these do not use adaptive power control, but rather transmit all signals with equal power. Therefore, currently only time-consuming and complex simulations are feasible in order to evaluate the capacity of an OFDM-based radio network.

SUMMARY

It is thus one possible object to provide a method which allows a faster evaluation of OFDM based radio networks.

The inventors propose a method which comprises: providing data transmission parameters of an OFDM-based cellular network, said parameters including at least two values of a signal-to-interference-and-noise ratio and an associated achievable data throughput for at least one antenna of said network, and further including at least one required data throughput for at least one user; defining a transformed signal-to-interference-and-noise ratio based on said provided signal-to-interference-and-noise ratio; and determining two constant coefficients defining a linear function of said transformed signal-to-interference-and-noise ratio, wherein said linear function describes an approximated channel activity for a single user in uplink or downlink for said antenna of said network, said channel activity being defined as the ratio of required data throughput to achievable data throughput.

In some embodiments, the method may further comprise determining a total channel activity of at least one antenna for uplink and/or downlink from said single user channel activity.

According to exemplary embodiments, said determining of a total channel activity includes summing all determined single user channel activities for a predetermined set of users. Such a set of users may for example in some embodiments be as an estimated set of users being served by said antenna, based on previous use of an antenna; alternatively as the users currently covered by said antenna in another embodiment.

In exemplary embodiments, the method may further comprise checking whether said determined total channel activity for uplink and/or downlink has a value of less than one. This shows whether a cell will be overloaded with the selected parameters or whether it can serve all users as desired. In addition to such a check, the method may optionally comprise adapting parameters of said network such that said total downlink and/or uplink channel activity value is less than one.

According to some embodiments, the method may further comprise providing values of the receiving power for at least one antenna; determining further coefficients describing an interaction between several antennas; and calculating said total channel activity for one antenna including said further coefficients.

The constant coefficients may in exemplary embodiments define the gradient and the y-intercept for said linear function.

Also, said constant coefficients may in some embodiments be specific to at least one of: a user velocity, a transmission direction, a user location.

According to exemplary embodiments, said providing of an achievable data throughput includes measuring said achievable throughput for at least two different signal-to-noise-and-interference ratios.

In some embodiments, said transformed signal-to-noise-and-interference ratio is $$SINR_{trans} = \frac{1}{10^{SINR/10}},$$

defined as based on the original signal-to-noise-and-interference ratio SINR.

According to an embodiment, a mapping of a required channel activity channel activity to said transformed signal-to-noise-and interference ratio is determined, said required channel activity being defined by said required data throughput and said achievable data throughput. Optionally, said constant coefficients may be determined by a line fitting of said channel activity mapping.

In further exemplary embodiments, said constant coefficients are calculated based on a demanded transmit activity factor and a bit energy-to-noise density of a radio bearer.

According to some embodiments, said constant coefficients may be previously determined and stored in a database.

According to exemplary embodiments, the above method is performed in a radio communication network applying adaptive modulation and coding (AMC). The network may be based on OFDM, orthogonal frequency division multiplex.

The providing of network parameters may in some embodiments further include providing at least one of: a location for at least one antenna, transmission power parameters of said at least one antenna, service specifications, available modulation and coding schemes.

Furthermore, the method may in some exemplary embodiments further comprise identifying those potential antenna locations for an area to be covered by determining whether a certain provided set of network parameters provides a required channel activity for all users of said network.

The inventors also propose a computer program which may comprise program means stored in a computer readable medium, the program code being adapted to perform any of the steps or substeps described above when executed on a computer or processor.

The inventors further propose a device i which may in exemplary embodiments comprise: a unit for providing data transmission parameters of an OFDM-based cellular network, said parameters including at least two values of a signal-to-interference-and-noise ratio and an associated achievable data throughput for at least one antenna of said network, and further including at least one required data throughput for at least one user; a unit for defining a transformed signal-to-interference-and-noise ratio based on said provided signal-to-interference-and-noise ratio; and a unit for determining two constant coefficients defining a linear function of said transformed signal-to-interference-and-noise ratio, wherein said linear function describes an approximated channel activity for a single user in uplink or downlink for said antenna of said network, said channel activity being defined as the ratio of required data throughput to achievable data throughput

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 4 illustrates exemplary steps of the proposed method.

DETAILED DESCRIPTION OF THE PREFERRED EMBODIMENT

Figure 1:
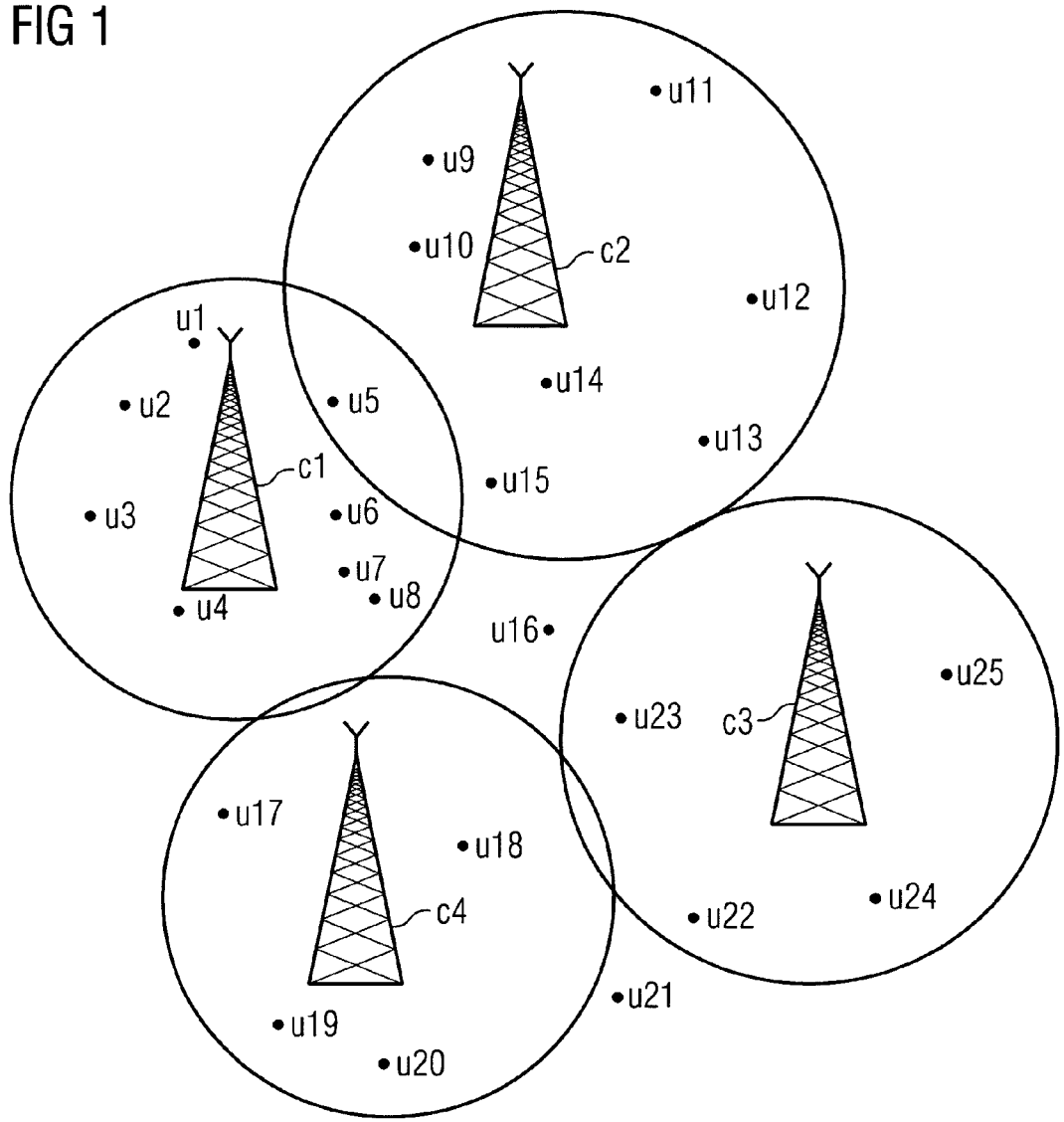
FIG. 1 shows a schematic structure of a proposed radio network.

Reference will now be made in detail to the preferred embodiments of the present invention, examples of which are illustrated in the accompanying drawings, wherein like reference numerals refer to like elements throughout.

FIG. 1 shows an exemplary structure of a radio communication network with several antennas c. Antenna positions in this example are chosen arbitrarily, and the method may for example be used for optimizing antenna positions by calculating capacity data for a plurality of potential antenna positions and setups. While only four antennas $c_1$ to $c_4$ are shown, the number n of antennas $c_n$ is generally not limited for purposes of this discussion. The area surrounding each of the antennas may be divided into separate pixels for analysis, each defining a single area unit. Various characteristics may be attributed to each pixel, such as a type of area (urban, rural, . . . ). At each pixel site, a certain number of users $u_i$ (or rather associated user terminals) may request services of the radio network. Users $u_i$ may be fixed or mobile in location. The network may offer one or more services, each having different characteristics such as error rates, traffic requirements and more. Services may include data service, voice service and more. The number of users and the type of services requested may e.g. be derived from current usage of an existing network for parameter optimization, or from estimations and averages based on previous usage and certain assumptions regarding user behaviour at this pixel. A coverage area of one antenna $c_n$ defines a cell, shown as a circle around an antenna in FIG. 1. While in this example, only one potential network situation or configuration is shown, all potential user positions have to be considered for network evaluation.

Figures 2, 3:
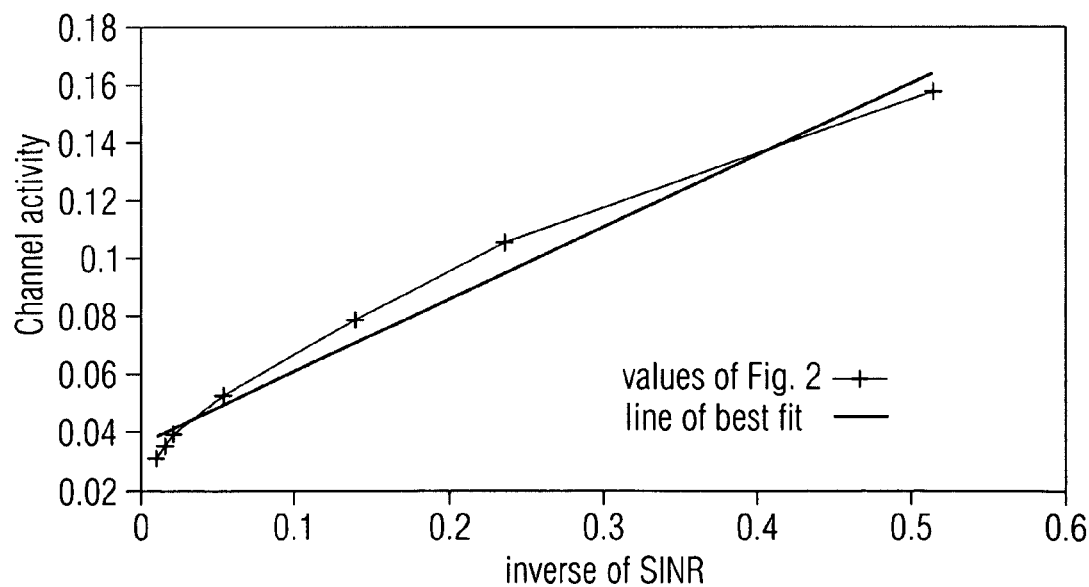
FIG. 2 is a table of exemplary dependencies of modulation and coding schemes, signal-to-noise ratio, and data throughput.
FIG. 3 depicts graphs for the mapping of inverse of SINR to channel activity for a service requesting a bandwidth of 1 Mbps, along with a corresponding linear approximation.

When the above network parameters are defined, a channel load and/or channel activity may be determined. Channel activity is defined as the required throughput of a channel divided by the offered throughput. This channel activity may be determined separately for uplink and downlink, or also e.g. separately for each user based on the user specific required throughput. Uplink refers to the connection from a mobile terminal or user equipment to an antenna, while downlink is the opposite direction, from an antenna to a user equipment. The achievable or offered throughput of a connection will be dependent on the signal-to-noise-and-interference ratio SINR, which in turn is dynamically dependent on the applied modulation and coding scheme. The larger the current SINR, the higher is the bit transmission rate on the connection. Also, the velocity of a user may have an influence on the AMC mechanism, allowing higher bandwidths at the same SINR level for a user with higher speed. Furthermore, the SINR is also dependent on the location of a user in relation to the antenna or base station. Users located close to the serving antenna will typically attain higher SINR than users located at cell boundaries. Exemplary values showing the dependency of AMC modulation scheme, data throughput and SINR are shown in the table of FIG. 2.

Thus, a mapping of SINR values to channel activities may be defined according to an embodiment. This mapping may e.g. be derived from known/measured values of the SINR and achievable throughput for several different coding and modulation schemes. For purposes of the proposed method, a transformed signal to noise ratio $SINR_{trans}$ is defined as 10 to the power of ($-SINR/10$) or $$SINR_{trans} = \frac{1}{10^{SINR/10}}, \tag{1}$$

with the SINR given in dB. When this transformed $SINR_{trans}$ is mapped to the channel activity values for a certain predetermined user velocity v, an approximately linear dependency between the channel activities and the transformed $SINR_{trans}$ is found. Such transformed channel activity mappings are shown with several data points in FIG. 3. Therefore, two velocity-specific constant coefficients $\Delta$ and $\Gamma$ may be determined from the mapping, which define the mean channel activity $\alpha_i$ per user i as a linear function of $SINRi_{trans}$, i.e.

$$\alpha_i = \Delta_i + \Gamma_i \cdot SINRi_{trans} = \Delta_i + \Gamma_i / 10^{SINRi/10} \tag{2}$$

$\Delta$ and $\Gamma$ are velocity dependent constants, with $\Delta$ defining the y-intercept of the linear channel activity function and $\Gamma$ giving the gradient; $\alpha$ is the channel activity per user, and $SINR_i$ is the signal-to-interference-and-noise ratio of a single user i.

Constants $\Delta$ and $\Gamma$ may in some embodiments be determined from a limited number of measured values (such as those of the table shown in FIG. 2) of channel activities and SINR by a line fitting process, using the above defined transformed SINR to approximate a linear function. This may easily be seen from the example graph of FIG. 3, which shows a mapping of exemplary values for a channel activity and respective transformed SINR values $SINR_{trans}$ for a service requesting a bandwidth of 1 Mbps. The channel activity of a service is the bandwidth of the service divided by the data throughput. The linear approximation for the channel activity, illustrated as straight line between the data points, does not introduce a large error. In other exemplary embodiments, the constants may be calculated based on a bit energy-to-noise density $E_b/N_0$ and a demanded transmit activity factor. The $E_b/N_0$ value is used to specify the lower limit of operation in most digital communications systems. The transmit activity factor indicates the percentage of time that a signal is present in a communication channel during a specified time interval, and is thus a value between 0 and 1.

The constants $\Delta$ and $\Gamma$ (and the resulting channel activity) may not only depend on the velocity of the user, but also on the type of service and e.g. on whether the user is located indoor or outdoor. Constants may also be different for downlink and uplink, thus defining a mean channel activity $\alpha_i^{dl}$ for the downlink and associated downlink constants $\Delta_i^{dl}$ and $\Gamma_i^{dl}$, and also a mean channel activity $\alpha_i^{ul}$ for the uplink with associated constants.

From this linear approximation for a single user, direction, and antenna, the total channel activity for antennas c and d in downlink or uplink may be determined by a summation of the separate channel activities for all users served by this antenna. This results in the following equations:

$$\alpha_c^{dl} = \alpha_c^{control,dl} + \left(U_c^{own,dl} + \sum_{d \neq c}\left(V_{c,d}^{other,dl} \cdot \alpha_d^{dl}\right)\right) \quad (3)$$

$$\alpha_c^{ul} = U_c^{own,ul} + V_c^{own,ul} \cdot I_c^{ul} \quad (4)$$

with the interference power $I_c^{ul}$ in mW at antenna c being defined as $$I_c^{ul} = \eta_c^{ul} + \sum_{d \neq c}\left(U_{c,d}^{other,ul} + V_{c,d}^{other,ul} \cdot I_d^{ul}\right) \quad (5)$$

Equation (3) determines the total downlink channel activity $\alpha_c^{dl}$ and equations (4) and (5) the total uplink channel activity $\alpha_c^{ul}$ of an antenna c. Coefficients U and V will be discussed and defined in more detail below; in any case, "own" refers to parameters related to the antenna of which the channel activity is currently determined, while "other" describes factors related to the further antennas of the radio network. $\alpha_c^{control}$ is the channel activity of the control channel, and $\eta_c^{ul}$ is the noise power of the receiver at the antenna c. Using these equations, only a few linear equations have to be solved in order to evaluate a network. A small number of iterations allows a fast numerical solution, which is not discussed here in detail and is easy to conclude for the person skilled in the art.

Equations (3) to (5) are based on the assumption that control signals are emitted with the same power as user data signals. It is not difficult for the person skilled in the art to adapt these equations to a situation where different transmit powers are used.

When the value of $\alpha_c$ for uplink or downlink is more than one ($\alpha_c > 1$), this indicates an overload of the respective cell c. As a result, the antenna will not be able to serve all users in this direction of transmission. Also, both uplink and downlink may be combined into a single condition such that $\alpha_c$ would have to be less than one for both uplink and downlink simultaneously. This may help to plan a network structure such that a required number of users can be served at any time with demanded services and quality-of-service levels, or to adapt network parameters accordingly to prevent a temporary overload in one or more cells.

As may be seen from equations (3) to (5), the influence of other antennas d is included in the resulting total channel activity for an antenna c by coefficients $V_{c,d}^{other,dl}$ and $\alpha_d$ in the downlink, and by the interference power $I_c$ (via the coefficients $U_{c,d}^{other,ul}$, $V_{c,d}^{other,ul}$) for the uplink. In eq. (3) and (5), the summations are performed across all antennas of the network except for the antenna c in question.

The coefficients used in these equations are defined as follows:

$$U_c^{own,dl} = \sum_{i \in S_c}\left(\Delta_i^{dl} + \Gamma_i^{dl} \cdot \frac{\eta_i^{dl}}{P_{c,i}^{dl}}\right) \quad (6)$$

$$V_{c,d}^{other,dl} = \sum_{i \in S_c}\left(\Gamma_i^{dl} \cdot \frac{P_{d,i}^{dl}}{P_{c,i}^{dl}}\right) \quad (7)$$

$$U_c^{own,ul} = \sum_{i \in S_c}(\Delta_i^{ul}) \quad (8)$$

$$V_c^{own,ul} = \sum_{i \in S_c}\left(\Gamma_i^{ul} \cdot \frac{1}{P_{c,i}^{ul}}\right) \quad (9)$$

$$U_{c,d}^{other,ul} = \sum_{i \in S_d}(\Delta_i^{ul} \cdot P_{c,i}^{dl}) \quad (10)$$

$$V_{c,d}^{other,ul} = \sum_{i \in S_d}\left(\Gamma_i^{ul} \cdot \frac{P_{c,i}^{ul}}{P_{d,i}^{ul}}\right) \quad (11)$$

All summations in equations (6) to (9) (resp. (10) to (11)) are performed over the set $S_c$ (resp. $S_d$) of all users i which are served by the specific antenna c (resp. d). This set of users may e.g. be determined by defining a minimum power requirement for received signals from this antenna, and by allocating all users to that antenna allowing the maximum received power of all antennas. $\eta_i^{dl}$ is the noise power of the receiver of the user equipment i, $P_{c,i}^{dl}$ is the downlink receiving power at the user equipment i for antenna c, and $P_{c,i}^{ul}$ is the uplink receiving power at antenna c for the user equipment i in mW.

The above is only one example embodiment for the relevant coefficients. In other embodiments, e.g. directed antennas may be used, which may be taken into account by discounting those summands which stem from an interferer from a different direction with the uplink/downlink of antenna c or i in the given setup.

The above described linear approximation of the channel activity and associated definition of a transformed SINR together lead to considerable simplifications in the evaluation of channel activity/load in a radio network. Instead of a large number of inter-dependent, nonlinear equations to be solved, only a small number of linear equations remain. This may in turn allow a simple and fast evaluation of coverage and effectiveness of a certain network setup.

The above discussion assumes predetermined antenna positions and at least some information about user locations. When several potential antenna positions shall be evaluated, the steps as described for a single antenna structure have to be performed for any relevant setup. Results of all evaluations performed may then be compared to find an optimum setup based on given requirements.

FIG. 4 illustrates an exemplary evaluation process for a OFDM radio network. In general, several possible setups of a radio network may be considered in order to determine the optimum setup regarding quality of service and number of users served. Setup parameters to be modified may in particular include antenna positions in planning of a new radio network, but also other and/or additional parameters, such as transmission power, services offered, service specifications, frequency carriers and many more. A particular network setup with corresponding parameters is selected first in step 102. The parameters used may be parameters of an existing network for optimization and planning, or also estimated parameters based on other networks. In step 104, a transformed SINR as defined above in equation (1) is determined. Using this transformed SINR, the linear approximation for the channel activity may be made by determining gradient and intercept coefficients in step 106. As mentioned above, such coefficients may be derived from mappings of a channel activity to the transformed SINR by a linear fit. The resulting linear function describes the channel activity, which may thus be determined for a single user in step 108 as one of the coefficients for the total channel activity. Taking into account all antennas of the network and all users served by each of the antennas in various ways, this allows to determine a total uplink or downlink channel activity in accordance with equations (3) and (4) above (step 110), using all coefficients as described above, which may have been calculated in step 108 before. For planning and/or optimization purposes, it may then be checked in step 112 whether the performance is acceptable. This check may include among others the assessment whether the total channel activities are smaller than one. A value above one may indicate an undesirable cell overload, while a value below one may indicate that all users can be served as desired in accordance with the given parameters of the current "configuration". Therefore, if the selected network setup indicates an overload, this cell cannot serve all users as desired. When the number of users which cannot be served is small, the selected setup may optionally still be acceptable, depending on the demands given. In other cases, the network parameters leading to an overload may be adapted in such a way in step 116 that acceptable values for channel activity will be achieved in the end. Depending on the situation and parameters, this may e.g. be achieved by only a slight modification of one or more parameters. When only a few parameters or aspects of the network to be evaluated would have to be modified, it may not be necessary to repeat the complete evaluation for all parameter values, but a part of the previous results may be reused for further calculations. This is indicated in FIG. 4 by showing several arrows leading from step 116 (parameter modification) to various stages of the evaluation process. Alternatively, a complete set of new parameters may be selected in step 116 for another configuration and evaluation method as above. When a network setup shows acceptable performance, i.e. acceptable capacity values, the associated parameters may be stored, postprocessed and/or further optimized in step 114 before network parameters are modified in step 116, by evaluating a new network configuration. The storing may include storing of network parameters into the set of possible parameters. Postprocessing may include cost evaluation or a detailed evaluation of performance. Further optimizing may include an adaptive search for optimized parameters. At a later point, all stored acceptable network setups may be compared to each other, with regard to several conditions such as quality, cost and effectiveness in order to select the optimum network setup.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:

1. A method, comprising:
providing data transmission parameters of an orthogonal frequency division multiplexing-based cellular network, said parameters including at least two values of a signal-to-interference-and-noise ratio and an associated achievable data throughput for at least one antenna of said network, and at least one required data throughput for at least one user;
defining a transformed signal-to-interference-and-noise ratio based on said provided signal-to-interference-and-noise ratio;
determining, using a processor, at least two constant coefficients defining a linear function of said transformed signal-to-interference-and-noise ratio, said linear function describing an approximated channel activity for a single user in uplink or downlink for the at least one antenna of said network, said approximated channel activity being defined as a ratio of each of the required data throughput to the achievable data throughput;
determining a total channel activity of the at least one antenna for uplink and/or downlink from said single user approximated channel activity; and
checking whether said determined total channel activity of the at least one antenna for uplink and/or downlink has a value of less than 1.

2. The method of claim 1, wherein said determining the total channel activity includes summing all determined single user channel activities for a predetermined set of users.

3. The method of claim 2, wherein said set of users is defined as an estimated set of users being served by said at least one antenna, based on previous use of the at least one antenna.

4. The method of claim 2, wherein said estimated set of users is defined as users currently covered by said at least one antenna.

5. The method of claim 1, further comprising:
adapting parameters of said network such that said total uplink and/or downlink channel activity is less than 1.

6. The method of claim 1, wherein said determining the total channel activity includes:
providing values of a receiving power for the at least one antenna;
determining additional coefficients describing an interaction between a plurality of antennas; and
calculating said total channel activity for the at least one antenna including said additional coefficients.

7. The method of claim 1, wherein said at least two constant coefficients define a gradient and a y-intercept for said linear function.

8. The method of claim 1, wherein said at least two constant coefficients are specific to at least one of a user velocity, a transmission direction, and a user location.

9. The method of claim 1, wherein said providing the associated achievable data throughput includes measuring achievable throughput for at least two different signal-to-noise-and-interference ratios.

10. The method of claim 1, wherein said transformed signal-to-interference-and-noise ratio is defined as $$SINR_{trans} = \frac{1}{10^{SINR/10}},$$

the transformed signal-to-interference-and-noise ratio being based on the provided signal-to-interference-and-noise ratio SINR.

11. The method of claim 1, wherein a mapping of a required channel activity to said transformed signal-to-interference-and noise ratio is determined, said required channel activity being defined by said at least one required data throughput and said associated achievable data throughput.

12. The method of claim 11, wherein said at least two constant coefficients are determined by a line fitting of said channel activity mapping.

13. The method of claim 1, wherein said at least two constant coefficients are calculated based on a demanded transmit activity factor and a bit energy-to-noise density of a radio bearer.

14. The method of claim 1, wherein said at least two constant coefficients are previously determined and stored in a database.

15. The method of claim 1, wherein said method is performed in a radio communication network applying adaptive modulation and coding.

16. The method of claim 1, wherein said providing data transmission parameters further includes providing at least one of a location for the at least one antenna, transmission power parameters of said at least one antenna, service specifications, and available modulation and coding schemes.

17. The method of claim 1, further comprising:
identifying potential antenna locations for an area to be covered by determining whether a certain provided set of data transmission parameters provides a required channel activity for all users of said network.

18. A non-transitory computer-readable medium encoded with a program, the program when executed by a computer, causes the computer to perform a method, comprising:
providing data transmission parameters of an orthogonal frequency division multiplexing-based cellular network, said parameters including at least two values of a signal-to-interference-and-noise ratio and an associated achievable data throughput for at least one antenna of said network, and at least one required data throughput for at least one user;
defining a transformed signal-to-interference-and-noise ratio based on said provided signal-to-interference-and-noise ratio;
determining at least two constant coefficients defining a linear function of said transformed signal-to-interference-and-noise ratio, said linear function describing an approximated channel activity for a single user in uplink or downlink for the at least one antenna of said network, said approximated channel activity being defined as a ratio of each of the required data throughput to the achievable data throughput;
determining a total channel activity of the at least one antenna for uplink and/or downlink from said single user approximated channel activity; and
checking whether said determined total channel activity of the at least one antenna for uplink and/or downlink has a value of less than 1.

19. A device, comprising:
at least one processor configured to execute:
providing data transmission parameters of an orthogonal frequency division multiplexing-based cellular network, said parameters including at least two values of a signal-to-interference-and-noise ratio and an associated achievable data throughput for at least one antenna of said network, and at least one required data throughput for at least one user;
defining a transformed signal-to-interference-and-noise ratio based on said provided signal-to-interference-and-noise ratio;
determining at least two constant coefficients defining a linear function of said transformed signal-to-interference-and-noise ratio, said linear function describing an approximated channel activity for a single user in uplink or downlink for said at least one antenna of said network, said approximated channel activity being defined as a ratio of each of the required data throughput to the achievable data throughput;
determining a total channel activity of the at least one antenna for uplink and/or downlink from said single user approximated channel activity; and
checking whether said determined total channel activity of the at least one antenna for uplink and/or downlink has a value of less than 1.

20. A method of determining channel activity for uplink and/or downlink in a network, comprising:
selecting specific network parameters, the parameters including at least one signal-to-interference-and-noise ratio;
determining a transformed signal-to-interference-and-noise ratio based on the selected at least one signal-to-interference-and noise ratio;
mapping, using a processor, channel activity for a single user in uplink or downlink for an antenna of the network to the transformed signal-to-interference-and-noise ratio by a linear fit to derive coefficients from the mapped channel activity to the transformed signal-to-interference-and-noise ratio;
determining channel activity of the single user for the antenna from the derived coefficients;
determining a total channel activity of the antenna for uplink and/or downlink from said single user approximated channel activity; and
checking whether said determined total channel activity of the antenna for uplink and/or downlink has a value of less than 1.

21. The method according to claim 20, wherein channel activity is defined as a ratio of required throughput for the single user to offered throughput for the antenna.

22. The method according to claim 21, wherein the offered throughput depends on the selected at least one signal-to-interference-and-noise ratio.

* * * * *

UNITED STATES PATENT AND TRADEMARK OFFICE
CERTIFICATE OF CORRECTION

PATENT NO. : 8,199,662 B2  
APPLICATION NO. : 12/153441  
DATED : June 12, 2012  
INVENTOR(S) : Xuemin Huang et al.

It is certified that error appears in the above-identified patent and that said Letters Patent is hereby corrected as shown below:

Title Page Column 2 (Other Publications), Line 1, Delete "Loaing" and insert -- Loading --, therefor.

Column 10, Lines 66-67, In Claim 11, delete "signal-to-interference-and noise ratio" and insert -- signal-to-interference-and-noise ratio --, therefor.

Column 10, Lines 52-53, In Claim 9, delete "signal-to-noise-and-interference ratios" and insert -- signal-to-interference-and-noise ratios --, therefor.

Column 12, Line 32-33 (Approx.), In Claim 20, delete "signal-to-interference-and noise ratio;" and insert -- signal-to-interference-and-noise ratio; --, therefor.

Signed and Sealed this  
Fourteenth Day of August, 2012

David J. Kappos  
*Director of the United States Patent and Trademark Office*